June 19, 1945. A. F. WILD 2,378,816
FOOD STORAGE RECEPTACLE
Filed Nov. 3, 1942

Inventor:
Albert F. Wild,
by Harry E. Dunham
His Attorney.

Patented June 19, 1945

2,378,816

UNITED STATES PATENT OFFICE 2,378,816

FOOD STORAGE RECEPTACLE

Albert F. Wild, Scotia, N. Y., assignor to General Electric Company, a corporation of New York Application November 3, 1942, Serial No. 464,419

6 Claims. (Cl. 219—19)

My invention relates to refrigerator cabinets and more particularly to food storage compartments or receptacles for use with refrigertaor cabinets.

It is an object of my invention to provide a new and improved food storage receptacle for refrigerator cabinets and the like.

Further objects and advantages of my invention will become apparent as the following description proceeds and the features of novelty which characterize my invention will be pointed out with particularity in the claims annexed to and forming a part of this specification.

In accordance with my invention, I have provided a food storage receptacle of the type suitable for storing butter or the like at a temperature which will maintain the butter or the like at a consistency which will enable easy spreading on bread, for example. This necessitates supplying heat to the receptacle in order to maintain the air at approximately sixty degrees F. as compared with the usual forty to forty-five degrees F. refrigerator box air temperature. Electric heating means is usually used for imparting heat to the receptacle. I provide switch means in the vicinity of the receptacle and so arrange the receptacle and switch that the switch is closed only when a predetermined weight of butter or other food is stored in the receptacle.

Figure 1:
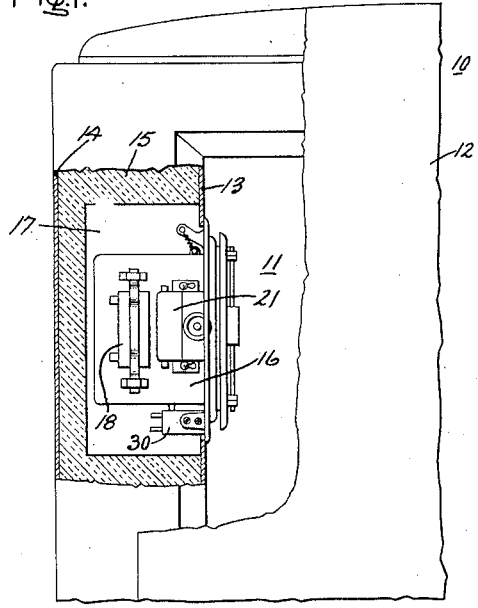
Figure 2:
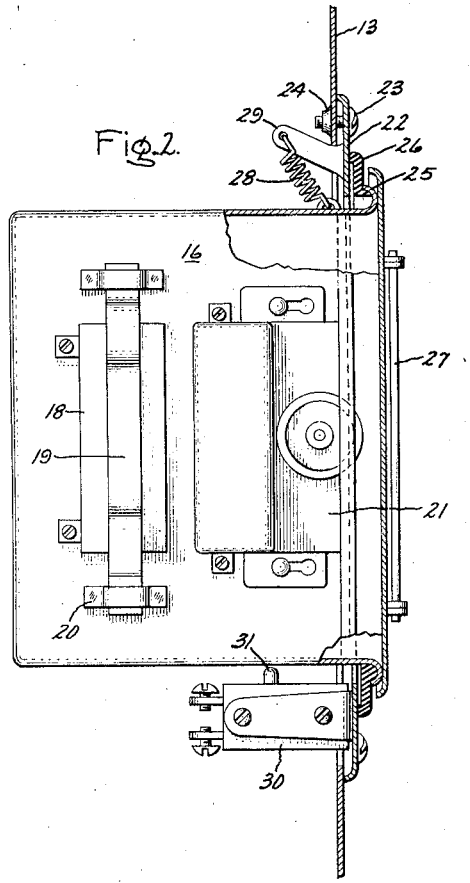
Figure 3:
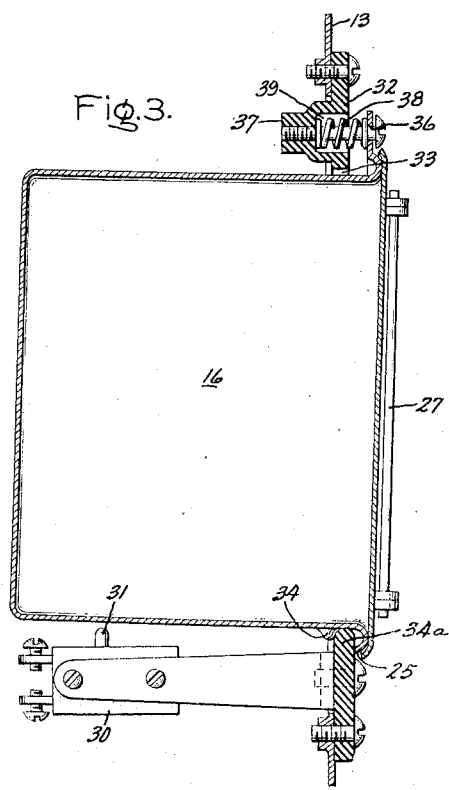
Figure 4:
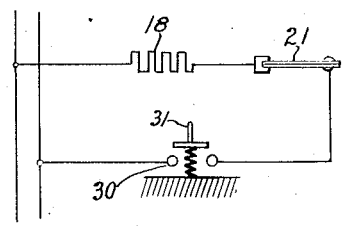

For a better understanding of my invention, reference may be had to the accompanying drawing in which Fig. 1 is a partial view, partly in section, of a refrigerator cabinet equipped with a food storage compartment embodying the principles of my invention, Fig. 2 is an enlarged view of the receptacle shown in Fig. 1, Fig. 3 illustrates a second embodiment of my invention, and Fig. 4 illustrates diagrammatically the electric circuit employed with the food storage compartment illustrated in the other figures.

In the drawing, there is illustrated a refrigerator cabinet 10 of the domestic type having a food storage compartment 11 defined by suitable thermally insulated walls and a suitable thermally insulated closure member 12. The walls of the cabinet may include an inner liner 13 and an outer casing 14, the space therebetween being filled with suitable thermal insulating material 15. Suitable means for refrigerating the compartment 11 may be provided but, inasmuch as the details thereof form no part of my present invention, it is believed unnecessary to illustrate any specific refrigerating system.

As best seen from Fig. 1, I have provided a storage receptacle 16. Inasmuch as the food storage compartment 11 is commonly run at a temperature of approximately forty-five degrees F. and butter must be at a temperature of about 60 degrees F. or warmer before it can be easily spread, it is necessary to provide means for heating the interior of the receptacles 16. In pursuance of this object, there is provided a recess 17 in the insulating material 15 into which the receptacle 16 extends. It will be obvious that the rate of heat exchange through the thin layer of insulation next to the receptacle will be greater than that through the main body of the insulation 15. In order to supplement the heat leakage through the cabinet wall, I have provided electric heating means 18 of any suitable type held against the wall of the receptacle by means of a suitable spring 19 and clips 20, for example.

In order to maintain a substantially constant temperature within the receptacle 16, I prefer to provide an adjustable thermostatic element 21 which will permit heat to be supplied to the receptacle only at temperatures below a predetermined level.

Suitable means is provided for supporting the receptacle 16 in place. In the form of my invention illustrated in the drawing, there is provided a circumferentially extending frame member 22 of any suitable material which may be secured to the inner liner 13 in any suitable manner as by threaded fastening members 23 extending into engagement with a suitable threaded opening 24 in the inner liner. The frame member is provided with an opening through which the receptacle extends. I have illustrated the use of a receptacle 16 having a rolled-over edge 25 which receives a circumferentially extending frame or rim member 26 which may be formed of any suitable material as a plastic material, for example. There is provided a closure member 27 for the receptacle.

If the heater means is connected in an electric circuit solely in accordance with the temperature of the receptacle, heat may be supplied to the receptacle when no food is being stored therein. Therefore, I have provided means whereby heat is supplied to the receptacle only when a predetermined weight of material is contained in the receptacle. In Figs. 1 and 2, I have illustrated resilient means, as the spring 28, for resiliently supporting the receptacle as from an arm 29 suitably attached to the inner side of the frame member 22. I have also provided suitable electric switch means 30 immediately adjacent the bottom wall of the receptacle 16, the switch, as shown in Fig. 4, being connected in a series circuit with the thermostat 21, the heater 18, and the electric circuit by which current is conducted to the heating means. The switch is secured in position in any desired fashion but is so disposed that when the sum of the weights of the receptacle and the butter or other food stored in the receptacle overcomes the upwardly acting bias of the spring 28, the receptacle 16 will move downwardly and engage the operating arm 31 to cause the latter to move the switch members to the circuit-closing position, thereby permitting control of the circuit by the thermostat. If the spring is correctly selected, the receptacle will move upwardly when the food is removed therefrom, thereby permitting the switch to move to its open circuit position for breaking the circuit and preventing operation of the heating means.

In the embodiment of my invention shown in Fig. 3, I have shown a food storage receptacle 16 which has a circumferentially extending frame member 32 of any suitable material suitably supported on the inner line 13. The frame member 32 is provided with an opening 33 through which the receptacle 16 extends and the bottom edge of the opening is arranged to serve as a pivotal support for the receptacle 16, as indicated by the numeral 34a. In order to maintain the receptacle 16 in position, there is provided on the outside of the bottom wall a rib 34 which cooperates with the turned-over edge 25 of the receptacle to provide a recess or space to receive the lower edge of the opening 33. The marginal edge of the upper wall of the receptacle is provided with a laterally extending flange 35 having an opening therein for a threaded member 36 which engages a suitable tapped opening in a boss 37 provided on the inner surface of the frame member 32. The pivotal support 34a engages the receptacle to the right of the center of gravity of the receptacle, as viewed in Fig. 3. In order to bias outwardly the receptacle 16, i. e., in opposition to the force of gravity acting on the receptacle, there is provided a spring 38 between the bottom of a recess 39 in the frame member 32 and the back of the lateral extension 35.

Inspection of Fig. 3 will indicate that when no material is stored in the receptacle 16, the spring 38 will cause the receptacle to tend to move clockwise about the lower edge of the opening 33, thereby opening the switch 30 and breaking the heater circuit. However, when a predetermined weight of butter or the like is placed in the receptacle, the weight of the receptacle plus the food and container therefor is sufficient to overcome the bias of the spring and cause movement of the receptacle in the counterclockwise direction about the pivot point and engage the operating member 31 of the switch to cause the switch to move to a position in which the electric circuit to the heater is closed.

Modifications will appear to those skilled in the art. For example, any suitable type of resilient support for the type of receptacle shown in Figs. 1 and 2 or any sort of bias for the type of receptacle shown in Fig. 3 may be employed. Moreover, any arrangement of the switch 30 may be used so long as the switch is so disposed that the addition of a predetermined weight to the receptacle will cause the switch to be moved from its open circuit position to its closed circuit position and vice versa. Any suitable materials may be employed for the receptacle and frame members.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. In a refrigerator of the type having thermally insulated walls and a metal liner defining a refrigerated food storage compartment, said walls having a recess formed therein and said liner having an opening providing communication between said recess and said compartment, a food storage receptacle arranged within said recess, and means including an insulating frame member for slidably mounting said receptacle in said opening, electrical heating means including a switch biased to its open position for maintaining the interior of said receptacle above the normal compartment temperature, an operating member for said switch arranged adjacent said receptacle, means for biasing said receptacle against gravity to an upper position within said opening, said biasing means being such that when a predetermined weight is placed in said receptacle it overcomes the biasing means and moves said receptacle into engagement with said switch operating means to energize said heating means whereby said heating means is energized only when said receptacle contains at least said predetermined weight.

2. In a refrigerator of the type having thermally insulated walls and a metal liner defining a refrigerated food storage compartment, said walls having a recess formed therein and said liner having an opening providing communication between said recess and said compartment, a food storage receptacle arranged within said recess and mounted for pivotal movement with respect to said liner whereby the weight of said receptacle and its contents tend to rotate said receptacle away from said compartment, electrical heating means including a switch biased to its open position for maintaining the interior of said receptacle above the normal compartment temperature, an operating member for said switch arranged adjacent said receptacle in the path of rotation thereof, means for biasing said receptacle away from said operating member, said biasing means being such that when a predetermined weight is placed on said receptacle it overcomes the biasing means and rotates said receptacle into engagement with said switch operating means to energize said heating means whereby said heating means is energized only when said receptacle contains at least said predetermined weight.

3. In a refrigerator of the type having thermally insulated walls and a metal liner defining a refrigerated food storage compartment, said walls having a recess formed therein and said liner having an opening providing communication between said recess and said compartment, a frame of insulating material secured about said opening, a food storage receptacle arranged within said recess and having its lower front portion resting on the lower edge of said frame for pivotal movement about said bottom edge of the opening of said frame, electrical heating means including a switch biased to its open position and having an operating member in the path of rotation of said receptacle for maintaining the interior of said receptacle above the normal compartment temperature, means for biasing said receptacle against gravity to a position out of engagement with said switch operating means, said biasing means being such that when a predetermined weight is placed in said receptacle it overcomes the biasing means and rotates said receptacle into engagement with said switch operating means to energize said heating means whereby said heating means is energized only when said receptacle contains at least said predetermined weight.

4. In a refrigerator of the type having thermally insulated walls defining a refrigerated food storage compartment, a recess formed in the walls of the compartment and having an opening providing communication with the compartment, a food storage receptacle arranged within said recess, means including a frame member for mounting said receptacle on a wall of the compartment and affording relative movement between said receptacle and the wall, electric heating means for maintaining the interior of said receptacle above the normal compartment temperature, said means including a switch biased to its open position, means adjacent said receptacle for operating said switch, and means for biasing said receptacle against gravity to a position such that when a predetermined weight is placed in said receptacle said receptacle moves against said biasing means to actuate said switch operating means and close said switch and when less than said predetermined weight is contained in said receptacle said receptacle is held by said biasing means in a position to maintain said switch in its open circuit position whereby said heating means is energized only when said receptacle contains said predetermined weight, said receptacle together with said electrical heating means and said switch and said biasing means all being removable from said recess with said frame member.

5. In a refrigerator of the type having a refrigerated food storage compartment, a food storage receptacle and electric heating means for maintaining the interior of said receptacle above the normal compartment temperature, said means including an electric circuit, switch means adjacent said receptacle, and means for pivotally supporting said receptacle in such a way that when a predetermined weight of food is placed in said receptacle said receptacle moves in a direction to close said switch but when less than said predetermined amount of food is contained in said receptacle said receptacle moves about said pivotal support in a direction to maintain said switch in its open circuit position, whereby said heating means is energized only when said receptacle contains said predetermined weight of food.

6. In a refrigerator of the type having a refrigerated food storage compartment, a food storage receptacle and electric heating means for maintaining the interior of said receptacle above the normal compartment temperature, said means including an electric circuit, switch means adjacent said receptacle, means for pivotally supporting said receptacle, said pivotal means supporting said receptacle at such a point that its weight tends to maintain said switch in its circuit-closing position when a predetermined weight of food is contained therein, and means for biasing said receptacle to a position in which said switch remains in its open circuit position, said biasing means beng so arranged and constructed that a predetermined weight of food overcomes said biasing force in order to move said receptacle to the position in which said switch is closed.

ALBERT F. WILD.